(12) United States Patent
Polaganga et al.

(10) Patent No.: US 11,991,536 B1
(45) Date of Patent: May 21, 2024

(54) MULTIPLEXING TECHNOLOGY SELECTION

(71) Applicant: T-Mobile Innovations LLC, Overland Park, KS (US)

(72) Inventors: Roopesh Kumar Polaganga, Bothell, WA (US); Deepak Nadh Tammana, Bothell, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 191 days.

(21) Appl. No.: 17/340,409

(22) Filed: Jun. 7, 2021

(51) Int. Cl.
| | |
|---|---|
| *H04W 24/02* | (2009.01) |
| *H04L 5/14* | (2006.01) |
| *H04W 4/029* | (2018.01) |
| *H04W 76/10* | (2018.01) |

(52) U.S. Cl.
CPC .............. *H04W 24/02* (2013.01); *H04L 5/14* (2013.01); *H04W 4/029* (2018.02); *H04W 76/10* (2018.02)

(58) Field of Classification Search
CPC ..... H04W 24/02; H04W 4/029; H04W 76/10; H04L 5/14
See application file for complete search history.

(56) References Cited

U.S. PATENT DOCUMENTS

| | | | | |
|---|---|---|---|---|
| 6,788,253 B1 * | 9/2004 | Calin | ................... | H04L 5/1484 342/464 |
| 8,412,204 B1 * | 4/2013 | Oroskar | ............ | H04W 36/0085 455/452.2 |
| 8,908,638 B2 * | 12/2014 | Chi | ....................... | H04W 36/14 455/439 |
| 2001/0055288 A1 * | 12/2001 | Uebayashi | ............ | H04W 48/18 370/331 |
| 2002/0181419 A1 * | 12/2002 | Zhang | ................... | H04L 41/147 370/352 |
| 2004/0203786 A1 * | 10/2004 | Ishiguro | ................ | H04W 36/32 455/436 |
| 2004/0264393 A1 * | 12/2004 | Desgagne | ............. | H04W 72/04 370/321 |
| 2005/0141450 A1 * | 6/2005 | Carlton | ................. | H04W 36/26 370/329 |

(Continued)

FOREIGN PATENT DOCUMENTS

WO    WO-2005032172 A1 *    4/2005    ........ H04W 36/0066

*Primary Examiner* — Joseph E Avellino
*Assistant Examiner* — Charles E Eckholdt
(74) *Attorney, Agent, or Firm* — Shook, Hardy & Bacon L.L.P.

(57) ABSTRACT

The technology described herein selects an optimal multiplexing technology to use for a communication session. The optimal technology will minimize the probability of a disruption (e.g., a dropped call) during a communication session. A multiplexing decision process may be implemented when a user equipment (UE) is not capable of transitioning between two different multiplexing technologies and is located in a geographic area where networks using two different multiplexing technologies are available. In one aspect, the selection of an optimal multiplexing technology considers the network context at a time when the communication session is initiated, the UE's context (e.g., location near network edge, mobility profile), a device profile for the UE model, the UE history, and usage history for the user of the UE.

20 Claims, 6 Drawing Sheets

(56) References Cited

U.S. PATENT DOCUMENTS

| | | | |
|---|---|---|---|
| 2011/0053596 A1* | 3/2011 | Wohlert | H04W 36/04 455/436 |
| 2015/0094075 A1* | 4/2015 | Sawai | H04W 16/32 455/452.1 |
| 2015/0109946 A1* | 4/2015 | Sharma | H04W 36/00835 370/252 |
| 2018/0242313 A1* | 8/2018 | Merchlinsky | H04W 72/0453 |
| 2021/0092660 A1* | 3/2021 | Cui | H04W 36/18 |

* cited by examiner

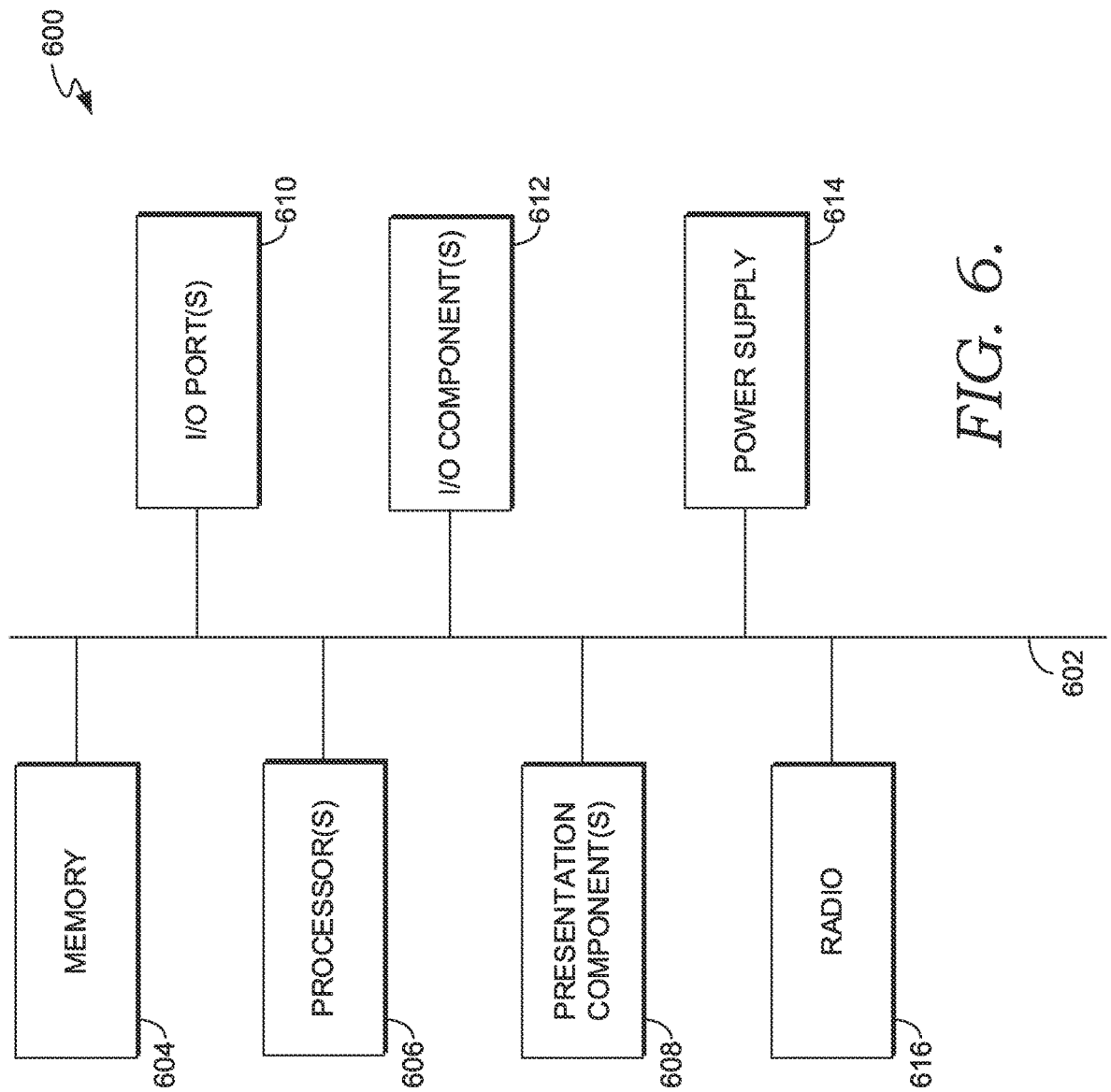

MULTIPLEXING TECHNOLOGY SELECTION

CROSS-REFERENCE TO RELATED APPLICATIONS

None.

SUMMARY

The technology described herein selects an optimal multiplexing technology to use for a communication session. The optimal technology will minimize the probability of a disruption (e.g., a dropped call) during a communication session. A multiplexing decision process may be implemented when a user equipment (UE) is not capable of transitioning between two different multiplexing technologies and is located in a geographic area where networks using two different multiplexing technologies are available. In this context, the transition from one multiplexing technology to the other during a communication session is a possible source of disruption. In one aspect, the selection of an optimal multiplexing technology considers the network context at a time when the communication session is initiated, the UE's context (e.g., location near network edge, mobility profile), a device profile for the UE model, the UE history, and usage history for the user of the UE.

BRIEF DESCRIPTION OF THE DRAWINGS

Illustrative embodiments of the present invention are described in detail below with reference to the attached drawing figures, and wherein:

FIG. 6 depicts a block diagram of an exemplary computing environment suitable for use in implementing embodiments herein.

DETAILED DESCRIPTION

Figure 1:
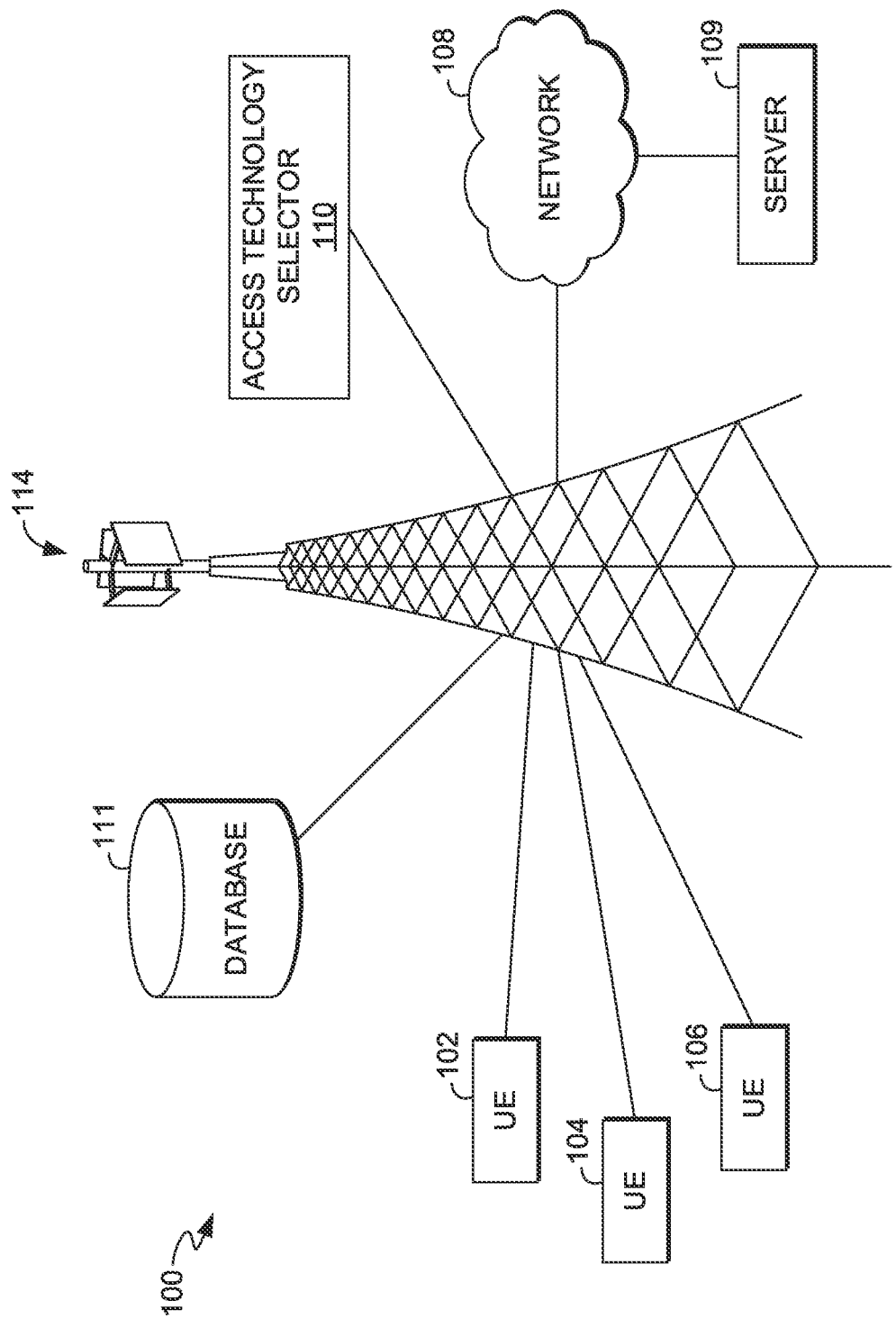
FIG. 1 depicts an exemplary wireless telecommunications network, according to an implementation of an embodiment of the present invention.

The subject matter of embodiments of the invention is described with specificity herein to meet statutory requirements. However, the description itself is not intended to limit the scope of this patent. Rather, the inventor has contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Wireless Technology |
| 4G | Fourth-Generation Cellular Communication System |
| 5G | Fifth-Generation Cellular Communication System |
| BS | Base Station |
| BTS | Base Transceiver Station |
| CD-ROM | Compact Disk Read Only Memory |
| CDMA | Code Division Multiple Access |
| CDMA2000 | Code Division Multiple Access 2000 |
| DL | Downlink |
| eNodeB | Evolved Node B |
| FDD | Frequency Division Duplex |
| gNodeB | Next Generation Node B |
| GPRS | General Packet Radio Service |
| GSM | Global System for Mobile communications |
| DVD | Digital Versatile Discs |
| EEPROM | Electrically Erasable Programmable Read Only Memory |
| HSDPA | High-Speed Downlink Packet Access |
| IoT | Internet of Things |
| LED | Light Emitting Diode |
| LTE | Long Term Evolution |
| MD | Mobile Device |
| MME | Mobility Management Entity |
| PC | Personal Computer |
| PCS | Personal Communications Service |
| PDA | Personal Digital Assistant |
| RAM | Random Access Memory |
| RF | Radio-Frequency |
| RFI | Radio-Frequency Interference |
| ROM | Read Only Memory |
| SMS | Short Message Service |
| TDD | Time Division Duplex |
| TDMA | Time Division Multiple Access |
| TXRU | Transceiver (or Transceiver Unit) |
| UE | User Equipment |
| UL | Uplink |
| UMTS | Universal Mobile Telecommunications Service |
| QCI | Quality of Service Class Identifier |
| VoLTE | Voice over Long-Term Evolution |
| WCDMA | Wideband Code Division Multiple Access |
| WiMAX | Worldwide Interoperability for Microwave Access |

Further, various technical terms are used throughout this description. An illustrative resource that fleshes out various aspects of these terms can be found in Newton's Telecom Dictionary, 31st Edition (2018).

The technology described herein selects an optimal multiplexing technology to use for a communication session. The optimal technology will minimize the probability of a disruption (e.g., a dropped call) during a communication session. A multiplexing decision process may be implemented when a user equipment (UE) is not capable of transitioning between two different multiplexing technologies and is located in a geographic area where networks using two different multiplexing technologies are available. In this context, the transition from one multiplexing technology to the other during a communication session is a possible source of disruption. In one aspect, the selection of an optimal multiplexing technology considers the network context at a time when the communication session is initiated, the UE's context (e.g., location near network edge, mobility profile), a device profile for the UE model, the UE history, and usage history for the user of the UE.

At a very high level, the technology described herein selects and/or recommends a multiplexing technology (e.g., TDD or FDD) for use in a communication session between a UE and a communication network. The recommendation may be considered by a base-station selection process in combination with other factors to make the final decision. In other aspects, the recommendation governs the decision without considering other factors and acts as a selection.

Initially, a communication session between a communication network and a UE is initiated in a geographic area where the communication network has both TDD and FDD capable equipment and the UE is both TDD and FDD capable. The TDD and FDD capable equipment could be located on a single cell tower or different cell towers. The technology described herein may not be deployed if either the UE or the communication network is not both TDD and FDD capable. When either the UE or the communication network is not both TDD and FDD capable, then the only choice may be to use the one multiplexing technology that both the communication network and the UE are capable of using.

UE capability Information may be accessed by the communication network. The capability information may be provided or accessed during setup of a communication session. The capability information may be in a UE Capability Information message, which describes UE radio access capabilities to the E-UTRAN (base station) or equivalent component. The UE Capability Information message may be received in response to a UE Capability Enquiry message. In one aspect, indicator 30 of the FeatureGroupIndicator indicates whether the UE supports TDD-FDD handoff. This indication may be intended as bi-directional, meaning the UE supports a handoff from either TDD to FDD or from FDD to TDD. In other aspects, the UE Capability Information is provided by the Mobility Management Entity (MME).

As used herein, user equipment (UE) (also referenced herein as a user device) can include any device employed by an end-user to communicate with a wireless telecommunication network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gauge, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station or access point. A UE can be, in an embodiment, similar to computing device 600 described herein with respect to FIG. 6.

Referring to FIG. 1, an exemplary network environment suitable for use in implementing embodiments of the present disclosure is provided. Such a network environment as illustrated in FIG. 1 is designated generally as network environment 100. Network environment 100 is but one example of a suitable network environment and is not intended to suggest any limitation as to the scope of use or functionality of the disclosure. Neither should network environment 100 be interpreted as having any dependency or requirement relating to any one or combination of components illustrated.

Network environment 100 includes user devices 102, 104, and 106, access point 114 (which may be a cell site, base transceiver station (also known as a base station), communication tower, a small cell, or the like), network 108, server 109, access technology selector 110, and database 111. In network environment 100, user devices can take on a variety of forms, such as a personal computer (PC), a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the server 109 or the computing device 600 of FIG. 6) that communicates via wireless communications with the access point 114 in order to interact with a public or private network. In this regard, the user device can be any mobile computing device that communicates by way of a wireless network, for example, a 1× circuit voice, a 3G network (e.g., CDMA, CDMA2000, WCDMA, GSM, UMTS), a 4G network (WiMAX, LTE, HSDPA), a 5G network, or any other type of network.

In some cases, the user devices 102, 104, and 106 in network environment 100 can optionally utilize network 108 to communicate with other computing devices (e.g., a mobile device(s), a server(s), a personal computer(s), etc.) through access point 114. The network 108 may be a telecommunications network(s), or a portion thereof. A telecommunications network might include an array of devices or components (e.g., one or more base stations), some of which are not shown. Those devices or components may form network environments similar to what is shown in FIG. 1, and may perform methods in accordance with the present disclosure. Components such as terminals, links, and nodes (as well as other components) can provide connectivity in various implementations. Network 108 can include multiple networks, as well as being a network of networks, but is shown in more simple form so as to not obscure other aspects of the present disclosure.

Continuing, network 108 can be part of a telecommunication network that connects subscribers to their immediate service provider. In some instances, network 108 can be associated with a telecommunications provider that provides services to user devices 102, 104, and 106. For example, network 108 may provide voice, SMS, video, or data services to user devices corresponding to users that are registered or subscribed to utilize the services provided by a telecommunications provider. Similarly, network 108 may provide services to user devices that correspond to relays, fixed sensors, internet of things (IoT) enabled devices, or any other device that provide connectivity or data to other devices. Network 108 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network. In aspects, the network 108 may enable communication over both TDD and FDD technology.

Generally, access point 114 is configured to communicate with user devices, such as user devices 102, 104, and 106 that are located within the geographical area, or cell, covered by radio antennas of a cell site (i.e. access point 114). Access point 114 can include one or more base stations (such as a gNodeB), base transmitter stations, radios, antennas, antenna arrays, power amplifiers, transmitters/receivers, digital signal processors, control electronics, GPS equipment, and the like. Access point 114 can include a wireless communications station that is installed at a fixed location, (e.g., a telecommunication tower) or a mobile base station (e.g., small cell) in some embodiments. In some embodiments, access point 114 also includes or is associated with an LTE System Manager (LSM) configured to manage a master list (e.g., a table) of amplitude weights. The list of amplitude weights may include a plurality of amplitude, phase, and power weights applicable to a plurality of antennas, antenna model numbers, radios, tilt angles of antennas, and the like. The listing may also include amplitude, phase, and power weights applicable to various broadcast configurations, such as multi-beam or unified beam.

Illustrative wireless telecommunications technologies include CDMA, CDMA2000, GPRS, TDMA, GSM, WCDMA, UMTS, and the like. Radio 616 might additionally or alternatively facilitate other types of wireless communications including Wi-Fi, WiMAX, LTE, 5G, or other VoIP communications. As can be appreciated, in various embodiments, radio 616 can be configured to support multiple technologies and/or multiple radios can be utilized to support multiple technologies. The multiple technologies can include multiple multiplexing technologies, such as TDD and FDD.

The back-end system can include one or more computing devices or servers 108, which are connected to the RAN. For example, machine-learning algorithms can be leveraged to identify patterns and predict changes in the network environment, including movement patterns of UEs. Machine learning algorithms include Regression algorithms, Instance-Based algorithms, Regularization algorithms, Decision Tree algorithms, Bayesian algorithms, Clustering algorithms, Association Rule Learning algorithms, Artificial Neural Network algorithms, Deep Learning algorithms, Dimensionality Reduction algorithms, Ensemble algorithms, to name a few.

The access technology selector 110 determines whether a communication session should be initiated on a first or second multiplexing technologies, such as TDD or FDD. The selection process used by the access technology selector 110 is described in detail elsewhere herein, for example, with reference to FIGS. 2-5. At a high level, the access technology selector 110 may initiate a selection process in response to receiving a request to initiate a communication session between the UE and the communication network. Preliminarily, a determination may be made that the UE is located at a point in the communication network served by two or more multiplex technologies, such as FDD and TDD. An additional determination may be made that the UE is able to access the network on the two or more multiplex technologies. Additionally, the type of communication session may dictate whether the selection process is initiated. In one aspect, the selection process is initiated when the communication session is for a phone call, videoconference, or other real time exchange of live audio or video data. In contrast, when the communication session is for streaming a song or video the selection process may be skipped or any recommendation generated from the selection process down weighted. The reason for this is that the user is less likely to experience a noticeable disruption while streaming a song or video because of buffering, among other factors, than when engaging a live exchange of information. Even if a handoff is not possible between multiplexing technologies, the network may be able to build a new connection on different multiplexing technology and continue the communication session without causing a major disruption to the user experience during a transmission of recorded audio or video data.

The access technology selector 110 may determine that the UE is not capable of a transition between a first multiplexing technology and a second multiplexing technology. The capability information may be in a UE Capability Information message, which describes UE radio access capabilities to the E-UTRAN (base station) or equivalent component. In another aspect, additional analysis is performed to determine whether the UE is capable of a transition in actuality, rather than in theory. An indication in the Capability Information message that the UE is not capable of transition may be dispositive. However, an indication in the Capability Information message that the UE is capable may lead to an analysis of past performance information to determine whether the UE is likely to experience a disruption during a transition despite being capable of transition.

The access technology selector 110 may calculate, based on a UE context, that the transition is less likely to occur when the communication session is initiated in the first multiplexing technology. Determining that a transition is less likely to occur on one multiplexing technology or the other can be based on matching past performance data to the present UE context. The UE context can conclude a large number of factors including, but not limited to, present location, device movement profile, specific device performance history, specific user movement patterns, and the like.

The access technology selector 110 may generate a recommendation that is used by the base station controller or other component to establish the communication session between the UE and the communication network using the first multiplexing technology.

Figure 2:
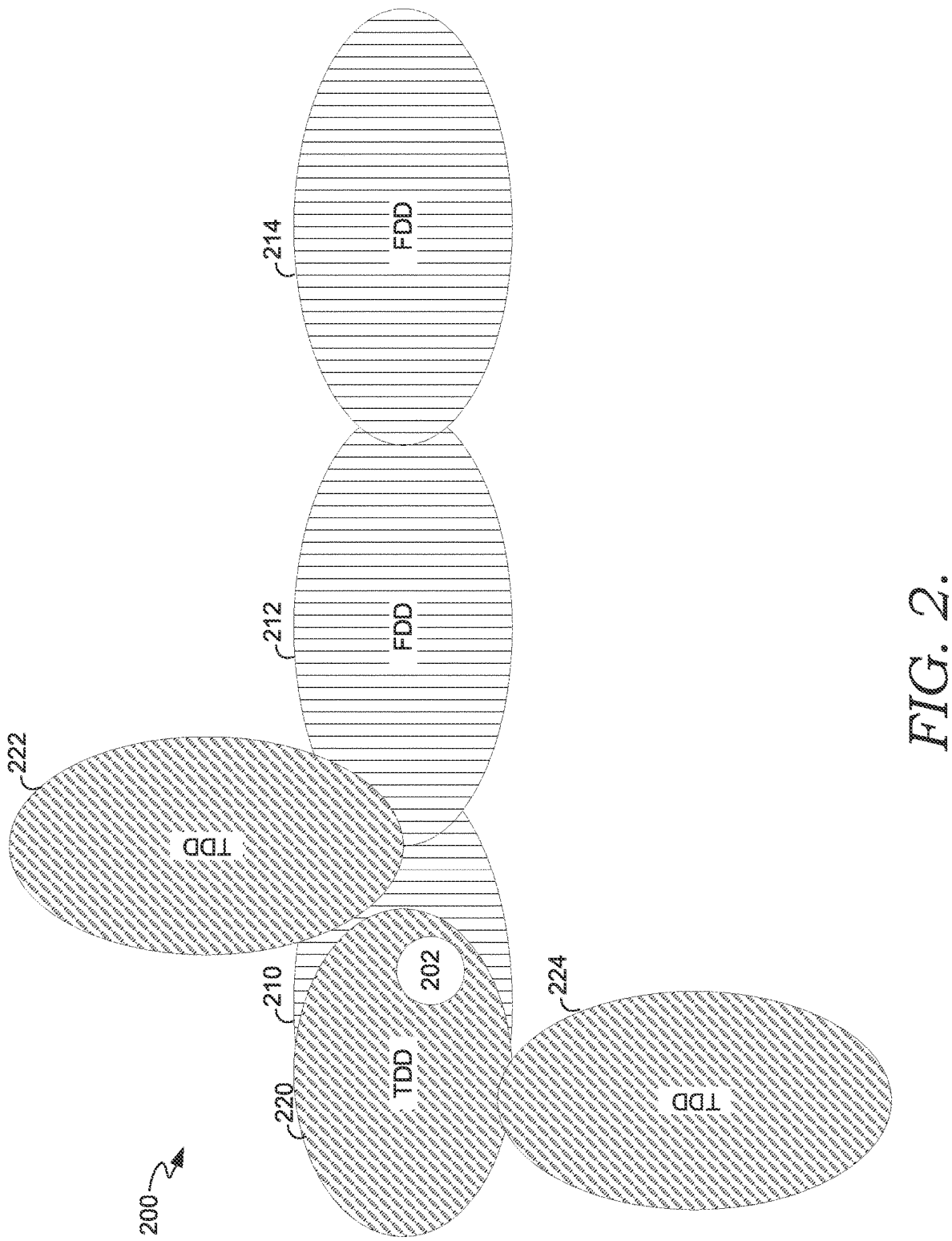
FIG. 2 depicts an exemplary coverage are with multiple overlapping multiplexing technologies, according to an implementation of an embodiment of the present invention.

In FIG. 2, a wireless telecommunications network 200 is shown with TDD coverage areas 220, 222, and 224. TDD coverage areas 220, 222, and 224 may comprise a BTS to transmit and receive RF signals with UEs, such as UE 202. In FIG. 2, TDD coverage areas 220, 222, and 224 define an area where RF signals are transmitted and received by an access point for communication purposes. FIG. 2 also includes FDD coverage areas 210, 212, and 214. FDD coverage areas 210, 212, and 214 may comprise a BTS to transmit and receive RF signals with UEs, such as UE 202. In FIG. 2, FDD coverage areas 210, 212, and 214 define an area where RF signals are transmitted and received by an access point for communication purposes.

FIG. 2 illustrates a context in which aspects the technology described herein may help avoid a disruption of the user experience. The UE 202 is located within TDD coverage area 220 and FDD coverage area 210. When initiating a communication session with the UE 202 in this location a determination may be made whether initiating a communication session on TDD technology or FDD technology is less likely to cause a disruption if a handoff between the technologies is required. In this context, the two technologies do not have overlapping coverage in much of the area depicted. In general, if the UE 202 were to move east then TDD coverage would no longer be available. In contrast, if the UE 202 were to move north or south FDD coverage would no longer be available. In this example, the user's previous movement patterns can be a useful signal to determine which access technology to select. For example, if the communication session is being initiated at a time when the user historically is completing a commute from work to home then the path previously taken on commutes can be used to determine whether the FDD or TDD technology should be used. If the user's past commute from the present location is north-south than the TDD technology should be selected. On the other hand, if the commute heads east then the FDD technology should be selected. This is just one example of how context can be used to select the optimal access technology.

Figure 3:
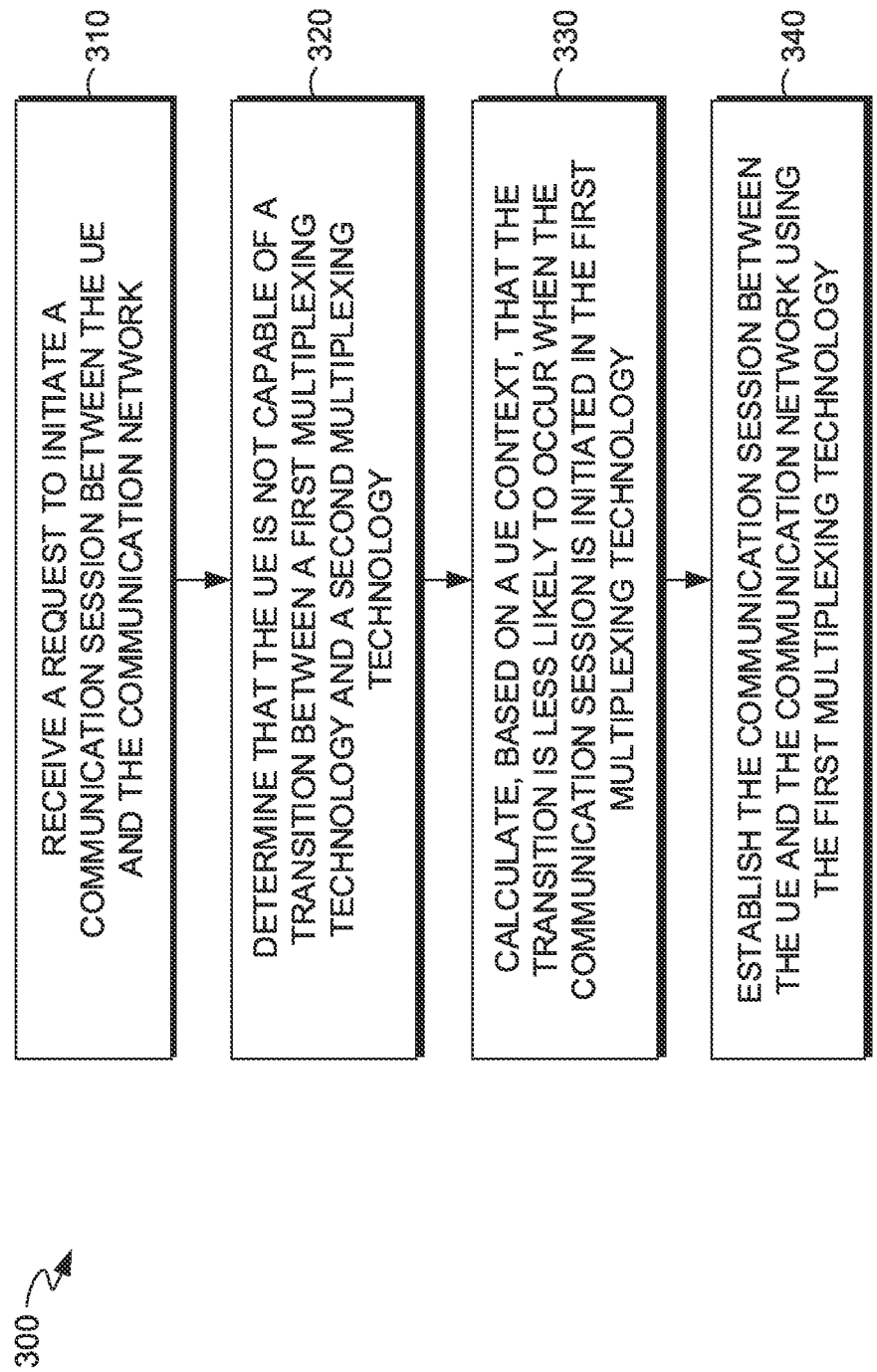
FIGS. 3-5 show methods for selecting a multiplexing technology for use during a communication session between a user equipment (UE) and a communication network that is capable of communication in two or more multiplex technologies, in accordance with some embodiments of the present invention.
Figure 4:
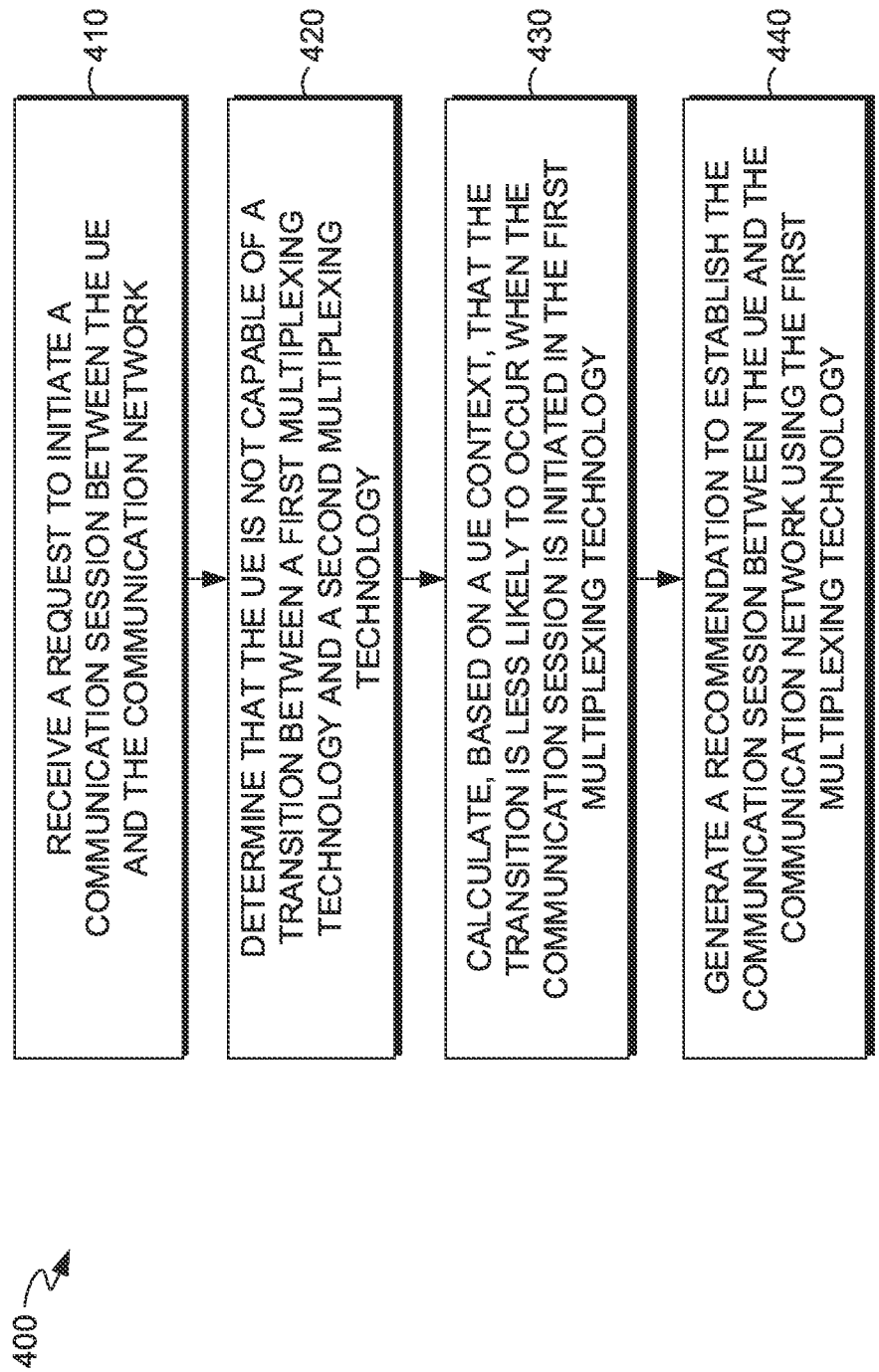
Figure 5:
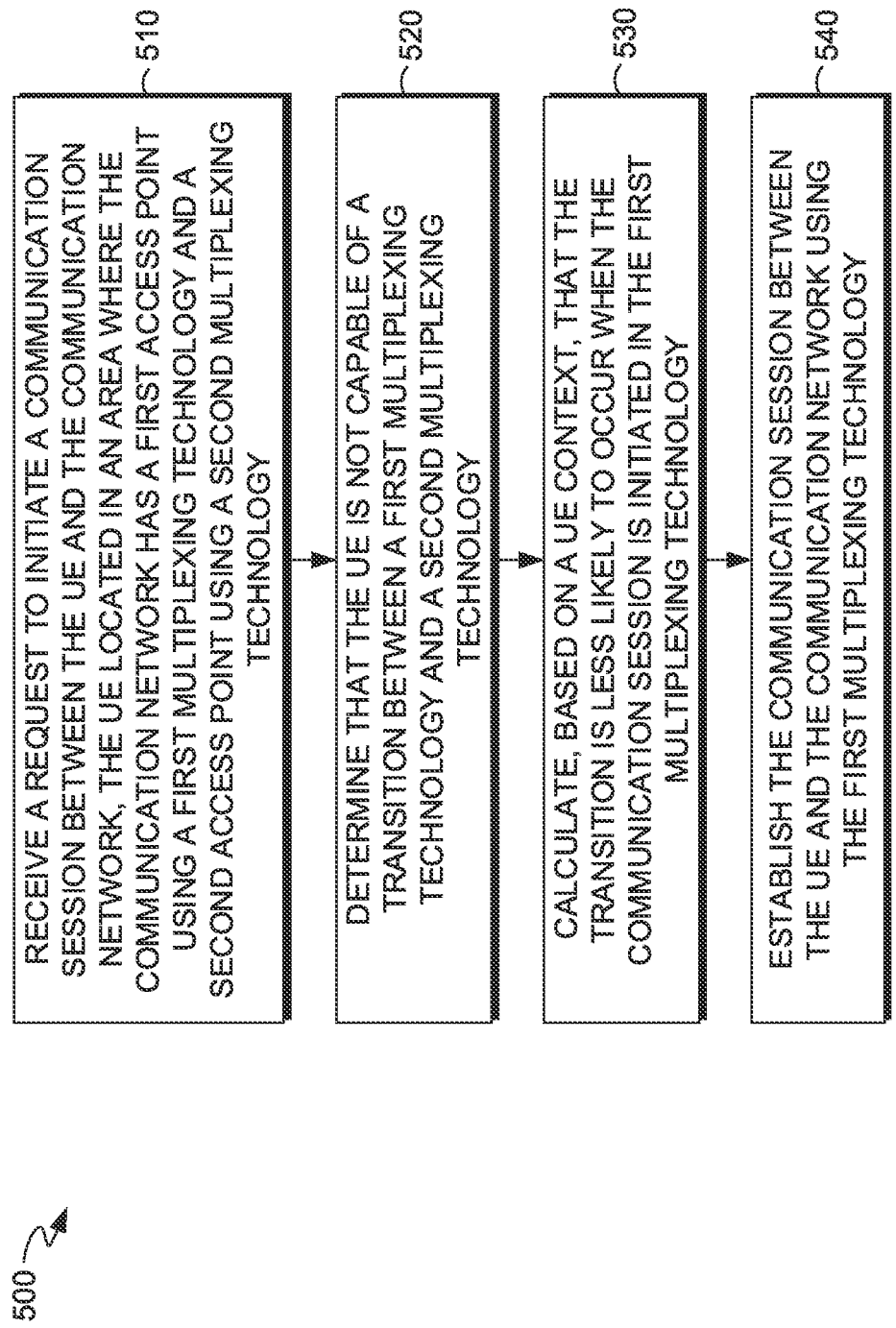

Now referring to FIGS. 3-5, each block of methods 300, 400, and 500, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by a standalone application, a service or hosted service (standalone or in combination with another hosted service), or a plug-in to another product, to name a few. In addition, methods 300, 400, and 500 are described, by way of example, with respect to the multiplex transition engine 110 of FIG. 1 and additional features of FIG. 2. However, these methods may additionally or alternatively be executed by any one system, or any combination of systems, including, but not limited to, those described herein.

FIG. 3 is a flow diagram showing a method 300 for selecting a multiplexing technology for use during a communication session between a user equipment (UE) and a communication network that is capable of communication in two or more multiplex technologies, in accordance with some embodiments of the present disclosure. At step 310, the method includes receiving a request to initiate a communication session between the UE and the communication network. Preliminarily, a determination may be made that the UE is located at a point in the communication network served by two or more multiplex technologies, such as FDD and TDD. An additional determination may be made that the UE is able to access the network on the two or more multiplex technologies.

At step 320, the method includes determining that the UE is not capable of a transition between a first multiplexing technology and a second multiplexing technology. The capability information may be in a UE Capability Information message, which describes UE radio access capabilities to the E-UTRAN (base station) or equivalent component. The UE Capability Information message may be received in response to a UE Capability Enquiry message. In one aspect, indicator 30 of the FeatureGroupIndicator indicates whether the UE supports TDD-FDD handoff. This indication may be intended as bi-directional, meaning the UE supports a handoff from either TDD to FDD or from FDD to TDD. In other aspects, the UE Capability Information is provided by the Mobility Management Entity (MME). In one aspect, the UE is determined to be capable of a transition if the UE Capability Information message indicates the UE is capable of a transition. Conversely, the UE is determined not to be capable of a transition if the UE Capability Information message indicates the UE is not capable of a transition.

In another aspect, additional analysis is performed to determine whether the UE is capable of a transition in actuality, rather than in theory. An indication in the Capability Information message that the UE is not capable of transition may be dispositive. However, an indication in the Capability Information message that the UE is capable may lead to an analysis of past performance information to determine whether the UE is likely to experience a disruption during a transition despite being capable of transition. A UE determined to have above a threshold probability of experiencing a disruption (e.g., dropped call) during transition may be classified as not capable of transition, despite the indication of having transition capability in the Capability Information message.

Past performance information may be aggregated across a number of different variables to determine whether a likelihood of disruption during transition is likely. For example, performance data from devices originating with a particular manufacturer (e.g., Apple, Samsung, LG) may be analyzed to determine the frequency of disruption during transition. If a disruption occurs above a threshold percentage of the time when a device for a particular manufacturer transitions from one multiplexing technology to another during a session, then devices associated with the manufacturer may be designated as not capable of a transition despite the manufacture's designation of the device as having transition capabilities. A similar analysis could be performed based on a specific model of the device. In this case, specific models may be designated as incapable of transition despite a designation that a model is capable of transition. In another aspect, the operating system, or operating system version, may be assigned a transition capability status by analyzing past performance. In one aspect, the threshold for designating a device as not capable of transition based on past performance is set at one standard deviation above the average disruption observed in the data set among devices designate as transition capable in a Capability Information message.

At step 330, the method includes calculating, based on a UE context, that the transition is less likely to occur when the communication session is initiated in the first multiplexing technology. Determining that a transition is less likely to occur on one multiplexing technology or the other can be based on matching past performance data to the UE context. When a positive past performance (e.g., no disruption) on a first technology matches the current context then the first technology can be recommended or selected. Conversely, when a negative past performance on the first technology matches the context, then the first technology may be avoided. In general, the past performance of the two technologies can be compared to determine the optimal technology. The observed difference in performance can be used to weight a recommendation. For example, if few transitions are observed on either technology in a given context, then the weight might be low. With a low weight, essentially either technology is likely to perform equally. Conversely, a large difference in performance may result in a recommendation with a high weight for the better performing multiplex technology. The UE context can conclude a large number of factors including, but not limited to, present location, device movement profile, specific device performance history, specific user movement patterns, and the like.

The present location can be used in isolation or in combination with other contextual factors. In isolation, the present location can be used to determine which multiplexing technology has better quality coverage in the area. Broadly, better quality coverage is less likely to produce a need for a transition. Quality coverage can be defined by a single factor or combination of factors. In some aspects, when multiple factors are used, then different weights are given to different factors to arrive at a measure of coverage quality. A first factor that may be used to define coverage quality is an amount of continuous area covered by a multiplexing technology near the present location. A greater amount of contagious coverage results in a higher coverage quality. A second factor to define coverage quality can be an amount of gaps in coverage near the present location. The gaps can be combined with a probability of UEs entering gap areas Thus, a third measure of coverage quality can be a lower amount of aggregate UE visits to gaps in coverage near the present location.

The device movement profile contains locations/time patterns that can predict where the user will be located at different times. For example, the movement profile may show the user is at a work location between 8 AM and 5 PM on weekdays, commuting between 7:30 AM and 8:00 AM and then again between 5:00 PM and 5:30 PM, and then home between 10:00 PM and 7:30 AM. This profile could be used to select the multiplexing technology with higher quality coverage in the area the user is likely to be at a given time when the communication session is initiated. A starting point for using the movement profile may be whether the present location is an expected location based on the movement profile. If the location is not expected, then the movement profile may not have sufficient predictive value to use in the selection process.

The specific device performance history can track a pattern of transitions and disruptions. The performance history can be used to select the multiplexing technology that has produced the lowest probability of a transition for a specific UE. The performance history may be combined with present location to determine the technology that produces the lowest probability of transition in the area near the present location. The performance history can help account for patterns in the user activity that may cause otherwise unpredictable transitions. For example, the user may frequent a portion of a building that blocks one multiplexed signal, but not the other. This situation can cause a transition.

The specific user movement patterns can be used like the UE movement pattern, but is built based on the user, rather than the UE. The specific user movement pattern can be built using data from multiple devices. Using the specific user movement pattern can avoid a cold start problem that exists when a new UE has not been used previously by a user.

At step 340, the method includes establishing the communication session between the UE and the communication network using the first multiplexing technology.

FIG. 4 is a flow diagram showing a method 400 for selecting a multiplexing technology for use during a communication session between a user equipment (UE) and a communication network that is capable of communication in two or more multiplex technologies, in accordance with some embodiments of the present disclosure. At step 410, the method includes receiving a request to initiate a communication session between the UE and the communication network. Preliminarily, a determination may be made that the UE is located at a point in the communication network served by two or more multiplex technologies, such as FDD and TDD. An additional determination may be made that the UE is able to access the network on the two or more multiplex technologies.

At step 420, the method includes determining that the UE is not capable of a transition between a first multiplexing technology and a second multiplexing technology. This determination may be made, as described previously with reference to FIG. 3.

At step 430, the method includes calculating, based on a UE context, that the transition is less likely to occur when the communication session is initiated in the first multiplexing technology. Determining that a transition is less likely to occur on one multiplexing technology or the other can be based on past performance data match to the UE context. The UE context can conclude a large number of factors including, but not limited to, present location, device movement profile, specific device performance history, specific user movement patterns, and the like.

At step 440, the method includes generating a recommendation to establish the communication session between the UE and the communication network using the first multiplexing technology. The recommendation may be used in combination with other factors, such as current bandwidth availability on the respective multiplex technologies, to make a technology selection. The recommendation may include a weight for use in combination with other factors. When a positive past performance (e.g., no disruption) on a first technology matches the current context then the first technology can be recommended or selected. Conversely, when a negative past performance on the first technology matches the context, then the first technology may be avoided. In general, the past performance of the two technologies can be compared to determine the optimal technology. The observed difference in performance can be used to weight a recommendation. For example, if few transitions are observed on either technology in a given context, then the weight might be low. With a low weight, essentially either technology is likely to perform equally. Conversely, a large different in performance may result in a recommendation with a high weight for the better performing multiplex technology.

FIG. 5 is a flow diagram showing a method 500 for selecting a multiplexing technology for use during a communication session between a user equipment (UE) and a communication network that is capable of communication in two or more multiplex technologies, in accordance with some embodiments of the present disclosure.

At step 510, the method includes receiving a request to initiate a communication session between the UE and the communication network. The UE located in an area where the communication network has a first access point using a first multiplexing technology and a second access point using a second multiplexing technology. An additional determination may be made that the UE is able to access the network on the two or more multiplex technologies.

At step 520, the method includes determining that the UE is not capable of a transition between the first multiplexing technology and the second multiplexing technology. This determination may be made, as described previously with reference to FIG. 3.

At step 530, the method includes calculating, based on a UE context, that the transition is less likely to occur when the communication session is initiated in the first multiplexing technology. Determining that a transition is less likely to occur on one multiplexing technology or the other can be based on past performance data match to the UE context. The UE context can conclude a large number of factors including, but not limited to, present location, device movement profile, specific device performance history, specific user movement patterns, and the like.

At step 540, the method includes establishing the communication session between the UE and the communication network using the first multiplexing technology.

With reference to FIG. 6, computing device 600 includes a bus 602 that directly or indirectly couples the following devices: memory 604, one or more processors 606, one or more presentation components 608, input/output (I/O) ports 610, input/output (I/O) components 612, and an illustrative power supply 614. Bus 602 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterate that the diagram of FIG. 6 is merely illustrative of an example computing device that can be used in connection with one or more embodiments of the present invention. Distinction is not made between such categories as "workstation," "server," "laptop," "handheld device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media is non-transitory. In contrast to communication media, computer storage media is not a modulated data signal or any signal per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 604 includes computer-storage media in the form of volatile and/or nonvolatile memory. The memory may be removable, non-removable, or a combination thereof. Example hardware devices include solid-state memory, hard drives, optical-disc drives, etc. Computing device 600 includes one or more processors that read data from various entities such as memory 604 or I/O components 612. Presentation component(s) 608 present data indications to a user or other device. Example presentation components include a display device, speaker, printing component, vibrating component, etc.

I/O ports 610 allow computing device 600 to be logically coupled to other devices including I/O components 612, some of which may be built in. Illustrative components include a microphone, joystick, game pad, satellite dish, scanner, printer, wireless device, etc.

Radio 616 represents a radio that facilitates communication with a wireless telecommunications network. Illustrative wireless telecommunications technologies include CDMA, GPRS, TDMA, GSM, W-CDMA, EDGE, CDMA2000, and the like. Radio 616 might additionally or alternatively facilitate other types of wireless communications including Wi-Fi, WiMAX, LTE, 5G, or other VoIP communications. As can be appreciated, in various embodiments, radio 616 can be configured to support multiple technologies and/or multiple radios can be utilized to support multiple technologies.

The invention claimed is:

1. A method for selecting a multiplexing technology for use during a communication session between a user equipment (UE) and a communication network that is capable of communication in two or more multiplex technologies, comprising:
   receiving a request to initiate a communication session between the UE and the communication network;
   receiving a response to a UE Capability Enquiry message from the UE indicating that the UE is not capable of a transition between a first multiplexing technology and a second multiplexing technology;
   calculating, based on a UE context, that the UE will be in a location where a transition is less likely to be required for the communication session initiated in the first multiplexing technology; and
   establishing the communication session between the UE and the communication network using the first multiplexing technology.

2. The method of claim 1, wherein the UE context is a present location and movement data and the UE context is used to calculate a likelihood of the UE moving to a geographic area where the communication network does not have access points that use the second multiplexing technology.

3. The method of claim 2, wherein the likelihood of the UE moving is based on movement patterns established based on previous movements of the UE.

4. The method of claim 1, wherein the UE context is a present location and time and the UE context is used to determine a likelihood of the transition occurring from the first multiplexing technology to the second multiplexing technology based on a pattern of past transitions associated with the UE from different locations and at different times.

5. The method of claim 1, wherein said determining that the UE is not capable of the transition between the first multiplexing technology and the second multiplexing technology is based on a device type of the UE.

6. The method of claim 1, wherein the communication session is for one of a telephone call and live video communication.

7. The method of claim 1, wherein the first multiplexing technology is time-division duplex (TDD).

8. The method of claim 1, wherein the first multiplexing technology is frequency division duplex (FDD).

9. A method for selecting a multiplexing technology for use during a communication session between a user equipment (UE) and a communication network that is capable of communication in two or more multiplex technologies, comprising:
   receiving a request to initiate a communication session between the UE and the communication network;
   receiving a response to a UE Capability Enquiry message, from the UE indicating that the UE is not capable of a transition between a first multiplexing technology and a second multiplexing technology;
   calculating, based on a UE context, that the UE will be in a location where a transition is less likely to be required for the communication session initiated in the first multiplexing technology; and
   generating a recommendation to establish the communication session between the UE and the communication network using the first multiplexing technology.

10. The method of claim 9, wherein the calculating is also based on a first available bandwidth on the first multiplexing technology and as second available bandwidth of the second multiplexing technology at a time of the request is received.

11. The method of claim 9, wherein said determining that the UE is not capable of the transition between the first multiplexing technology and the second multiplexing technology is based on a device type of the UE.

12. The method of claim 9, wherein the UE context is a present location and a time and the UE context is used to determine a likelihood of the transition occurring from the first multiplexing technology to the second multiplexing technology based on a pattern of past transitions associated with the UE from different locations and at different times.

13. The method of claim 9, further comprising using the recommendation in combination with other factors to select the first multiplexing technology.

14. The method of claim 9, wherein said determining that the UE is not capable of the transition between the first multiplexing technology and the second multiplexing technology is based on a history of the UE.

15. The method of claim 9, wherein the first multiplexing technology is time division duplex (TDD).

16. One or more computer storage media comprising computer executable instructions embodied thereon, which when executed by a computing device cause the computing device to perform a method for selecting a multiplexing technology for use during a communication session between a user equipment (UE) and a communication network that is capable of communication in two or more multiplex technologies, comprising:
   receiving a request to initiate a communication session between the UE and the communication network, the UE located in an area where the communication network has a first access point using a first multiplexing technology and a second access point using a second multiplexing technology;
   receiving in response to a UE Capability Enquiry message, from the UE that the UE is not capable of a transition between a first multiplexing technology and a second multiplexing technology;
   calculating, based on a UE context, that the UE will be in a location where a transition is less likely to be required for the communication session initiated in the first multiplexing technology; and
   establishing the communication session between the UE and the communication network using the first multiplexing technology.

17. The media of claim 16, wherein the UE context is a present location and time and the UE context is used to determine a likelihood of the transition occurring from the first multiplexing technology to the second multiplexing technology based on a pattern of past transitions associated with the UE from different locations and at different times.

18. The media of claim 16, wherein the UE context is a present location and movement data and the UE context is used to calculate a likelihood of the UE moving to a geographic area where the communication network does not have access points that use the second multiplexing technology.

19. The media of claim 16, wherein said determining that the UE is not capable of the transition between the first multiplexing technology and the second multiplexing technology is based on a history of the UE.

20. The media of claim 16, wherein the calculating is also based on a first available bandwidth on the first multiplexing technology and as second available bandwidth of the second multiplexing technology at a time of the request is received.

* * * * *